(12) United States Patent
Rigaudon et al.

(10) Patent No.: US 8,252,110 B2
(45) Date of Patent: Aug. 28, 2012

(54) LIGHTWEIGHT PLASTERBOARD AND PLASTER SLURRY COMPOSITION USED FOR ITS MANUFACTURE

(75) Inventors: Michel Rigaudon, Communay (FR); Frédéric Peronnet, Shanghai (CN)

(73) Assignee: Lafarge Platres, Avignon Cedex (FR)

( * ) Notice: Subject to any disclaimer, the term of this patent is extended or adjusted under 35 U.S.C. 154(b) by 0 days.

(21) Appl. No.: 13/092,576

(22) Filed: Apr. 22, 2011

(65) Prior Publication Data

US 2011/0197793 A1 Aug. 18, 2011

Related U.S. Application Data

(62) Division of application No. 12/295,475, filed as application No. PCT/IB2007/001684 on Mar. 27, 2007.

(30) Foreign Application Priority Data

Mar. 30, 2006 (FR) ...................... 06 02758

(51) Int. Cl.
| | |
|---|---|
| C09C 1/00 | (2006.01) |
| C04B 9/04 | (2006.01) |
| C04B 11/00 | (2006.01) |
| C04B 28/14 | (2006.01) |
| C04B 16/02 | (2006.01) |
| C08L 3/00 | (2006.01) |
| C09D 103/00 | (2006.01) |
| C09J 103/00 | (2006.01) |

(52) U.S. Cl. ............ 106/779; 106/804; 106/206.1; 106/217.01; 428/449; 428/532; 428/702

(58) Field of Classification Search .......... 428/449, 428/704, 533
See application file for complete search history.

(56) References Cited

U.S. PATENT DOCUMENTS

| | | | |
|---|---|---|---|
| 1,769,519 A | 7/1930 | King et al. | |
| 4,676,335 A | 6/1987 | Adams | |
| 5,085,929 A | 2/1992 | Bruce et al. | |
| 5,158,612 A | 10/1992 | Savoly et al. | |
| 5,240,639 A | 8/1993 | Diez et al. | |
| 5,643,510 A | 7/1997 | Sucech | |
| 6,783,587 B2 | 8/2004 | Sethuraman et al. | |
| 2003/0010254 A1 | 1/2003 | Mentink et al. | |
| 2003/0084980 A1 | 5/2003 | Seufert et al. | |
| 2004/0045481 A1 | 3/2004 | Sethuraman et al. | |
| 2005/0126437 A1 | 6/2005 | Tagge et al. | |
| 2007/0284027 A1* | 12/2007 | Sahay ........................ 156/39 |

FOREIGN PATENT DOCUMENTS

| | | |
|---|---|---|
| EP | 0 172 773 A1 | 2/1986 |
| EP | 0 807 612 A1 | 11/1997 |

(Continued)

OTHER PUBLICATIONS

International Search Report issued on Mar. 27, 2008 in corresponding PCT/IB2007/001684.
International Preliminary Report on Patentability and Written Opinion issued on Oct. 9, 2008 in corresponding PCT/IB2007/001684.

*Primary Examiner* — Anthony J Green
*Assistant Examiner* — Karam Hijji
(74) *Attorney, Agent, or Firm* — Buchanan Ingersoll & Rooney PC

(57) ABSTRACT

A plaster slurry composition includes plaster, water and starch, the starch having a Brookfield viscosity of less than 60 cps at a temperature below 60° C. and a Brookfield viscosity greater than 10,000 cps at a temperature of 70° C.

10 Claims, 2 Drawing Sheets

FOREIGN PATENT DOCUMENTS

| | | |
|---|---|---|
| EP | 0 936 201 A2 | 8/1999 |
| FR | 1 429 406 A | 1/1965 |
| SU | 1 100 264 A | 6/1984 |
| WO | WO 95/16515 A1 | 6/1995 |
| WO | WO 97/23337 A1 | 7/1997 |
| WO | WO 99/08978 A1 | 2/1999 |
| WO | WO 02/24595 A1 | 3/2002 |
| WO | WO 02/070427 A1 | 9/2002 |

* cited by examiner

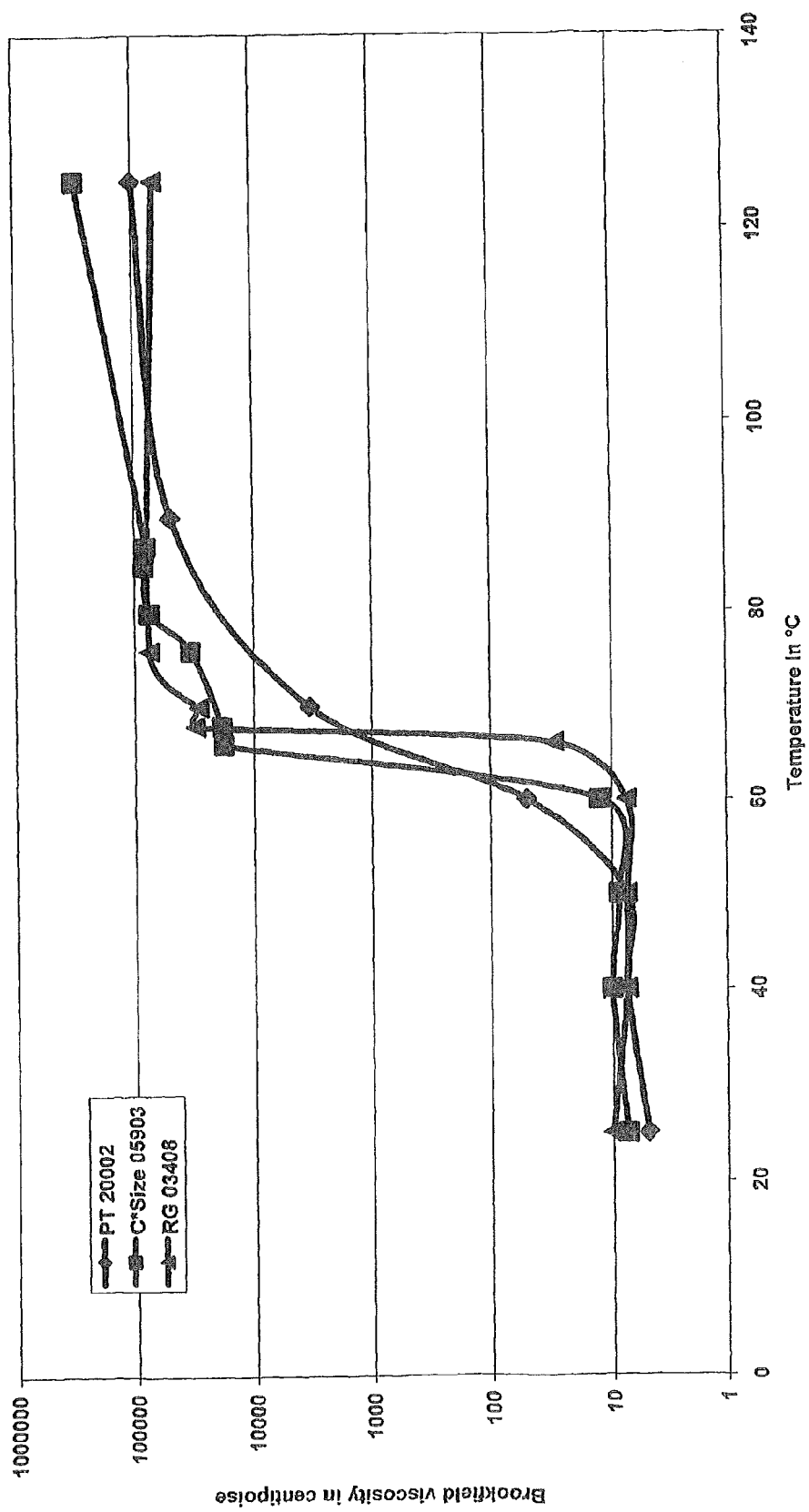

LIGHTWEIGHT PLASTERBOARD AND PLASTER SLURRY COMPOSITION USED FOR ITS MANUFACTURE

This application is a divisional of application Ser. No. 12/295,475, filed Sep. 30, 2008, which is the National Stage filing under §371 of PCT/IB2007/001684, filed Mar. 27, 2007, which, in turn, claims priority to French Patent Application No. 06/02758, filed Mar. 30, 2006, the entire content of each of which is incorporated herein by reference.

TECHNICAL FIELD

One subject of the invention is a novel lightweight board or a novel board having better mechanical compression properties, and also a plaster slurry composition used in its manufacture. The invention also provides a method for manufacturing such a board and use of a specific starch in the manufacture of a plasterboard.

PRIOR ART

Plasterboards have been known for many years. These boards generally comprise two sheets or facings, generally made of paper or paperboard, between which a plaster core is sandwiched. The facings have a certain tensile strength whereas the core has a certain compressive strength.

Furthermore, it is sought to lighten the plasterboards, while still having good mechanical properties. A critical aspect is the compressive strength of the core of the board. A method is therefore sought for preparing a plasterboard with a core having a higher compressive strength for densities that are identical to current densities, which would allow the board strengths to be obtained for lower densities.

One feature that has been the subject of numerous studies is the adhesion of the paper onto the plaster core of the board. In order to improve the adhesion, starch is generally added to the plaster slurry and during drying of the board the starch migrates towards the paper and concentrates at the core/facing interface. This is obtained by selecting a starch that has a particular rheology as a function of the temperature.

FR-A-1 429 406 and EP-A-0 172 773 describe the use of natural or modified starches for manufacturing boards with a paper facing, having an improved core/paper adhesion.

EP-A-0 936 201 describes the use of starch mixtures that are modified with respect to the long-term strength of mixtures of cement-type material, including plaster. The objective in this document is to control the setting and the slump value of the mixed slurry without there being any effect on the long-term strengths.

EP-A-0 807 612 describes the use of cationic starch in plaster slurries, which has a nitrogen content of less than 0.15% and a solubility greater tan 50%. The starch is presented as a thickener for the plaster slurry.

EP-A-0 172 773 describes the use of starch having a very precise particle size, as an adhesive in the core for the facings. The advantage presented by the specific particle size is a better migration of the starch towards the core/facing interface.

SU-A-1 100 264 describes the use of alkyl sulphates and fibres for increasing the shock resistance and impact strength. The presence of starch is optional.

Thus, the starch in the plasterboards is very generally used only at the core/facing interface.

US 2004/0 045 481 and U.S. Pat. No. 6,783,587 describe a plaster slurry for a lightweight board comprising hemihydrate, starch, foam and water, and in which the starch represents from 1.5 to 3% by weight relative to the weight of the hemihydrate and the W/P ratio is between 0.7 and 0.95. It is indicated that the resulting boards have a reduced density. The starch used is any starch, but the example uses an acid-modified starch, available from Staley Manufacturing. The starch from this document is of the thin-boiling type.

US 2003/0 084 980 describes a plaster slurry for a lightweight board comprising hemihydrate, acid-modified starch, a starch crosslinking agent and water, the pH of the slurry being around 9 to 11. The acid-modified starch is of the same type as that mentioned in documents US 2004/0 045 481 and U.S. Pat. No. 6,783,587. It is indicated that the starch used has a lower gelatinization temperature, which facilitates its migration towards the core/facing interface, while the crosslinking makes it possible to prevent the starch from completely migrating out of the core. It is furthermore indicated that the starch also has a use as a binder in the core of the board. It is indicated that the acid-modified starches have gelatinization temperatures typically of 70 to 77° C., for example 72° C. In the cooked form, in the board at the time it passes into the dryer, the starch is said to be thin boiling, that is to say that it is fluid, in the form of a syrup, but it turns to a gel when the temperature decreases. In the invention that is the subject of the patent, increasing the pH value of the plaster slurry reduces the gelatinization temperature to values around 60-66° C., typically 61° C. In the cooked form, the acid-modified starch thus treated (i.e. thus crosslinked) is solid, that is to say that it is more viscous than a thick-boiling starch, and a syneresis effect (separation of the water and of a solid from a gel) appears. In this document, increasing the pH within a given range is necessary in order to obtain the crosslinking and the associated effect.

US 2005/0 126 437 describes the use, for increasing the strength, of a modified starch that is insoluble in the plaster slurry during mixing, but which is dissolved when the temperature increases. The starch is modified, for example, by hydroxyalkylation or acetylation.

Nothing in the prior art describes or suggests the invention, which satisfies the requirement of providing a lightweight board having good mechanical characteristics.

SUMMARY OF THE INVENTION

The addition of a certain type of starch to the core of the board makes it possible to increase the compressive strength by up to 30%, or even 50%, the starch having a particular theological profile.

The invention therefore provides a plaster slurry composition comprising plaster, water and starch, said starch having a Brookfield viscosity of less than 60 cps at a temperature below 60° C. and a Brookfield viscosity greater than 10,000 cps at a temperature of 70° C.

According to one embodiment, the starch has a Brookfield viscosity of less than 20 cps at a temperature of 60° C.

According to one embodiment, the starch has a Brookfield viscosity of greater than 20,000 cps, preferably greater than 30,000 cps, at a temperature of 70° C.

According to one embodiment, the starch has a Brookfield viscosity of greater than 60,000 cps at a temperature of 80° C.

According to one embodiment, the starch is of the non-retrograding type.

According to one embodiment, the starch has a viscosity at 25° C., after cooling following heating of the starch solution up to 90° C., which is greater than the maximum viscosity obtained during heating of said starch solution.

According to one embodiment, the starch has a viscosity at 25° C., after cooling following heating of the starch solution up to 90° C., of at least 100,000 cps, advantageously of at least 300,000 cps.

According to one embodiment, the composition comprises, relative to the weight of plaster, between 0.05 and 1%, preferably between 0.1 and 0.5% by weight of starch.

According to one embodiment, the composition has a pH between 5.5 and 8.5, preferably between 6 and 7.5.

According to one embodiment, in the composition, the W/P ratio varies from 0.55 to 0.95, preferably from 0.65 to 0.80.

According to one embodiment, the composition comprises, in addition, a thin-boiling starch.

Another subject of the invention is a plasterboard comprising a core obtainable by setting of a plaster slurry according to the invention.

According to one embodiment, the plasterboard has a core density varying from 540 kg/m$^3$ to 1100 kg/m$^3$, preferably from 750 kg/m$^3$ to 950 kg/m$^3$.

According to one embodiment, the plasterboard has one, preferably two, facing(s).

According to one embodiment, the facing is paper, or a mat or nonwoven, preferably a mat of glass fibres and/or of synthetic and/or cellulose fibres, said facing being optionally filled with a fine filler and/or a filler that has optionally received a surface treatment.

One further subject of the invention is a method for preparing a plasterboard consisting of a core based on plaster and at least one, advantageously two, facing(s), said method comprising the following steps:

preparation of a slurry of the plaster composition according to the invention by mixing the various constituents of the composition with water in a mixer;

deposition of the slurry thus prepared on at least one facing, followed by shaping, into a ribbon, with optional covering of the upper face of the slurry using a second facing;

where appropriate, shaping the edges of the ribbon of the board obtained previously by moulding of the ribbon on profiled bands;

hydraulic setting of the plaster on a manufacturing line while the ribbon of board runs along a conveyor belt;

cutting the ribbon at the end of the line into predetermined lengths; and drying the boards obtained.

One further subject of the invention is the use, for manufacturing a plasterboard, of starch having a Brookfield viscosity of less than 60 cps at a temperature below 60° C. and a Brookfield viscosity greater than 10,000 cps at a temperature of 70° C.

One further subject of the invention is the use, for increasing the compressive strength of a plasterboard, preferably by at least 0.5 MPa, of starch having a Brookfield viscosity of less than 60 cps at a temperature below 60° C. and a Brookfield viscosity greater than 10,000 cps at a temperature of 70° C.

According to one embodiment, the uses according to the invention employ the starch described herein.

BRIEF DESCRIPTION OF THE FIGURES

FIG. 2 is a graph representing the viscosity as a function of the temperature for three starches according to the invention.

Figure 1:
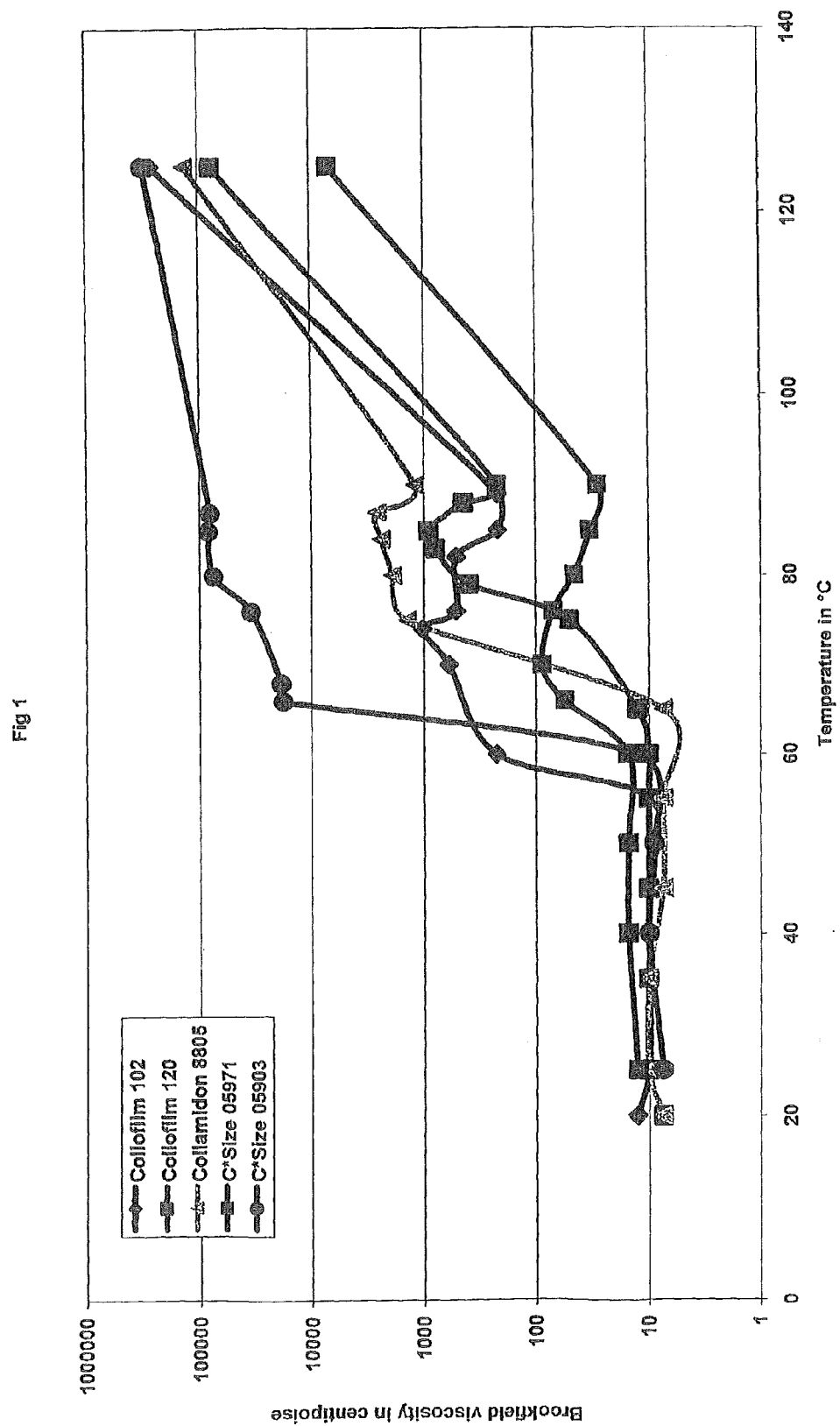
FIG. 1 is a graph representing the viscosity as a function of the temperature for a starch according to the invention and for several thin-boiling starches. The point at 125° C. in fact represents the point for the temperature of 25° C., after beating up to 90° C.

The point at 125° C. in fact represents the point for the temperature of 25° C., after heating up to 90° C.

DETAILED DESCRIPTION OF EMBODIMENTS OF THE INVENTION

Starch

The starch used in the invention has a fundamentally different rheology as a function of temperature, which enables the starch to be dispersed in the core at low temperatures in order to penetrate into the inter-crystalline spaces (without the Applicant being tied to one theory). As soon as the temperature is above 60° C., the viscosity of the starch increases rapidly up to a very high level to ensure that the starch actually remains in the core and does not migrate to the core/facing interface. In the invention, an effect more or less opposite to the thin-boiling starches is sought. Once the starch is thickened, it remains at a high viscosity at the high temperatures of the dryer. As can be seen in FIG. 1, for the thin-boiling starches of the prior art, the viscosity in fact decreases after a peak around 80-85° C. The starch is said to be a retrograding starch. According to one embodiment, the starch according to the invention has a viscosity that remains high and does not have a peak; the starch is preferably a non-retrograding starch.

According to one embodiment, the starch also has the characteristic that the viscosity remains high even after the starch is cooled, indeed is even higher. The starch used in the invention may be, for example, (i) of the type whose viscosity increases further during cooling or (ii) of the type whose viscosity remains constant during cooling, or else (iii) of the type whose viscosity only decreases by a maximum of 15% during cooling.

Without wanting to be tied to one theory, the Applicant believes that the starch which is viscous at the gypsum crystal interfaces contributes to the increase of the compressive strength.

The starch is chosen by measuring the Brookfield viscosity of a solution obtained by dissolving 100 g of starch in 600 ml of water at a temperature of 20° C. The solution is brought to 60° C. and then heated at a rate of 1° C./min up to 90° C. The solution is stirred during the heating. The viscosity is measured at various temperatures (for example: 20, 40, 60, 65, 70, 75, 80, 85, 90° C. etc.). The viscometer is a Brookfield viscometer adapted for measuring viscosities from 1 to 100,000 cps in particular. The testing is made with the number 6 spindle at the speed setting of 10, allowing the maximum result to be directly read off the Brookfield viscometer between 50 and 80% of the range on the scale. Outside that range, another spindle may be selected.

In contrast with a thin-boiling starch whose viscosity generally remains less than or equal to 1000 cps up to 90° C., the starch used in the invention is of the thick boiling type, and according to one embodiment it is non-retrograding. In general, the starch that can be used in the invention has a Brookfield viscosity of less than 60, preferably of less than 20 cps at a temperature below 60° C. and a Brookfield viscosity greater than 20,000 cps at a temperature of 70° C., preferably greater than 30,000 cps at a temperature of 70° C., advantageously greater than 60,000 cps at a temperature of 80° C. The starch that can be used in the invention also preferably has a high viscosity up to high temperatures, for example 90° C., whereas the thin-boiling starches generally have a drop in the viscosity at these high temperatures (these thin-boiling starches are, as already indicated, retrograding). Advantageously, the starch according to the invention will retain a high viscosity for the entire heating and cooling duration. According to one embodiment, the viscosity of the solution at 25° C. after cooling following heating to 90° C. will be greater than the viscosity peak during heating. When the starch is of the non-retrograding type, there is no actual peak to speak of and the peak is then considered to be the highest value for the temperature of 90° C. For example, the Brookfield viscosity of the starch at 25° C., after cooling following heating of the solution up to 90° C., is at least 100,000 cps, advantageously at least 300,000 cps.

The amount of starch used in the invention is variable. In general, the amount of starch, expressed relative to the amount of hemihydrate involved, may be between 0.05 and 1%, preferably between 0.1 and 0.5%, by weight. In general, the amount, for a board of density around 8.5 kg/m$^2$, is from 5 to 50 g/m$^2$, in particular from 10 to 30 g/m$^2$.

These starches are commercially available, especially from Cerestar under the references RG 03408, PT 20002 and C*size 05903.

FIG. 1 gives a comparison between a thin-boiling starch from the prior art and a thick-boiling starch according to the invention; as indicated previously.

Finally, it should be noted that the use of the starch according to the invention does not in any way prevent the use, at the same time, of a thin-boiling starch for improving the core/facing interface. Thus, according to one embodiment, the plasterboard also contains a thin-boiling starch for the adhesion at the core/facing interface.

Components of the Plasterboard.

The other components of the plasterboard are conventional components. They are in the first place hydratable calcium sulphate. The term "plaster slurry" is understood here to mean a conventional plaster composition, that is to say for the most part composed of plaster. The pH of such a slurry is typically between 5.5 and 8.5, in particular 6 to 7.5. According to one variant, no additive capable of changing the pH towards basic values is added during the preparation of the slurry.

The term "plaster" is understood, in the present description, to mean the product resulting from the hydraulic setting and hardening of hydratable calcium sulphate, that is to say anhydrous calcium sulphate (anhydrite II or III) or calcium sulphate hemihydrate ($CaSO_4$, ½$H_2O$) in its α or β crystalline form. These compounds are well known to a person skilled in the art and are generally obtained by calcining gypsum. It is possible to use natural or synthetic (FGD type) gypsum.

The composition may also comprise other hydraulic binders in small quantities.

The core density may vary from 540 kg/m$^3$ to 1100 kg/m$^3$, especially from 750 kg/m$^3$ to 950 kg/m$^3$.

The core material may also comprise aggregates and/or fillers, such as for example fumed silica, fly ash, blast furnace slag, lime, vermiculite, perlite, microspheres, limestone, recycled components, etc.

The plaster-based composition according to the invention may comprise, in addition, additives that are conventionally used in plaster-based compositions and are well known to a person skilled in the art. In this respect, mention may be made of setting accelerators, setting retarders, binding agents, adhesive agents, plasticizers, water-retaining agents, air-entraining agents, thickeners, bactericides, fungicides, reinforcing materials, flame retardants and/or fillers. It is also possible to add additives for obtaining boards having water-resistant properties (waxes, silicones, etc.) or fire resistant properties.

Resins may also be used to further reinforce the board, such as polyacrylic, polystyrene, polyvinyl chloride, polyolefin, polyurethane, cellulosic, polyalcohol, polyamide, polyester, polyether, polyphenolic, polysulphide, polysulphone, silicone or fluoropolymer resins.

Examples of retarder/accelerator pairs are conventional retarder/BMA, sodium polyacrylate/aluminium sulphate and sodium phosphonate/zinc sulphate.

A bubble-stabilizing agent may also be used.

Agents that modify viscosity may also be added. Examples are polymers of variable nature, clays, or additives having a modified surface.

In a very conventional manner, a foaming agent is added to the plaster slurry composition before it sets. In general, alkyl sulphates, alkyl ether sulphates or mixtures thereof may be used. Examples may be found in the following documents: U.S. Pat. No. 4,676,335, U.S. Pat. No. 5,158,612, U.S. Pat. No. 5,240,639, U.S. Pat. No. 5,085,929, U.S. Pat. No. 5,643,510, WO-A-95 16515, WO-A-97 23337, WO-A-02 70427 and WO-A-02 24595. The amount is standard and may be from 0.01 to 1 g/l of slurry (expressed in dry weight/dry weight of slurry).

According to one embodiment of the invention, air is introduced, in addition, to the plaster-based composition by adding, for example, a foam. This foam may be produced by using any suitable foaming agent, for example, the foaming agent of formula $ROSO_3M$, as defined in page 14, line 20 to page 15, line 16 of international application WO 99/08978.

The plaster composition may, in addition, comprise fibres, in particular glass fibres, if necessary.

The void volume in the core may vary within wide limits, depending on the type of aeration in the mixture and on the W/P ratio. Typically, the W/P ratio varies from 0.55 to 0.95, preferably from 0.65 to 0.80. The facings used in the invention are typically made of paper or paperboard, but facings may also be used in the form of mats or nonwovens, for example made from a mat of glass fibres and/or synthetic and/or cellulose fibres. Facings may also be used comprising mixtures of different types of fibres, especially glass fibres and organic fibres and/or facings containing a fine filler dispersed in the fibres forming the mat. Surface treatments to make the facing hydrophobic or to make it fire resistant may also be provided.

The plasterboard thus obtained in the invention has: (1) for equal compressive strengths, a lower density (and therefore a lower surface weight) or (2) for equal densities (and therefore for equal surface weights), an increased compressive strength, advantageously increased by at least 0.5 MPa.

The board according to the invention is available in conventional dimensions and thicknesses, especially in the form of a standard so-called BA13 board. Thicknesses other than 12.5 mm are possible, for example 10 mm or less, or 15 mm or more.

Method for Manufacturing Plasterboards

The final subject of the invention is a method for continuously manufacturing plasterboards, essentially comprising the following steps:

preparation of a slurry of the plaster composition according to the invention by mixing the various constituents of the composition with water in a mixer;

deposition of the slurry thus prepared on at least one facing, followed by shaping, into a ribbon, with optional covering of the upper face of the slurry using a second facing, especially shaping consisting in feathering the edges of the board;

where appropriate, shaping the edges of the ribbon of the board obtained previously by moulding of the ribbon on profiled bands;

hydraulic setting of the plaster on a manufacturing line while the ribbon of board runs along a conveyor belt;

cutting the ribbon at the end of the line into predetermined lengths; and drying the boards obtained.

The plaster slurry composition is obtained conventionally by mixing the hemihydrate with water. The additives may be introduced with the hemihydrate, in particular when they are in powder form or with a portion of the water for mixing when they are water soluble or available in liquid form. If a foam is injected into the mixer, the additives may also optionally be present in that foam.

The drying step is carried out at standard temperatures in the plasterboard manufacturing lines; from this point of view, the use of starch according to the invention does not change the conventional processes. Likewise, the other properties of the board are acceptable in every aspect. There is no setting delay effect and no thickening of the slurry which could result in a variation of the size of the board. There is no problem with drying the board under the normal conditions in the dryer. The adhesion of the facing to the core in the wet state and in the dry state is good in every case.

EXAMPLES

The following examples illustrate the invention without limiting it.

Example 1

Laboratory miniboards were prepared with the following composition. Two different starches were used, Cerestar PT 20002 and C*size 05903, A and B respectively. FIG. 2 shows the viscosity as a function of temperature. FIG. 2 also shows the viscosity of a third starch capable of being used in the invention, RG 03408. The starches presented in the figures are given solely by way of illustration.

The miniboards are obtained from a slurry comprising (in grams):

| | |
|---|---|
| Plaster | 1017 |
| Water | 590 |
| Foaming agent (alkyl sulphate) | 0.5 |
| BMA (Ball Mill Accelerator) | 3 |
| $K_2SO_4$ | 1 |
| Plasticizer | 3 |
| Retarder | 0.028 |

The volume of the foam was 770 ml, the amount of water used to form the foam being 180 g.

The paper was a conventional facing paper, with a basis weight of 205 g/m$^2$.

Thus, boards having a thickness of 12.5 mm and a density of 8.5 kg/m$^2$ were prepared. Next, a starch was added, of which the rheological profile is given in the graph from FIG. 2, 10 and 20 g/m$^2$.

The results are given in the table below.

| | Without starch | Starch A | Starch A | Starch B | Starch B |
|---|---|---|---|---|---|
| Starch dose (g/m$^2$) | 0 | 10 | 20 | 10 | 20 |
| Compressive strength (MPa) | 5.02 | 5.71 | 5.62 | 6.3 | 6.46 |
| Increase in the compressive strength (%) | | 13.7 | 10.8 | 25.5 | 28.7 |

Example 2

An industrial scale process was used on a plasterboard manufacturing line. The board manufactured was the standard BA13 board, with a density of 9.15 kg/m$^2$, a W/P ratio of 0.59, a line speed of 68 in/min, using a conventional starch for adhesion of the paper facing. The starch B was used at a dilution of 50% in water. The diluted starch solution was added to the mixing water in two doses, 8 and 25 g/m$^2$. The line was kept in production for 1 minute. The following results for the compressive strength (dry conditions) were obtained, averaged for 5 values. The variations recorded were at most 6%.

| Sample | Starch concentration (g/m$^2$) | Compressive strength of the board (MPa) | Increase (%) |
|---|---|---|---|
| 1 | 0 | 2.90 | — |
| 2 | 8 | 3.18 | 9.7 |
| 3 | 25 | 3.85 | 32.8 |
| 4 | 37 | 4.37 | 50.7 |

A substantial increase was therefore observed on adding the starch according to the invention.

What is claimed is:

1. A method for increasing the compressive strength of a plasterboard, the method comprising forming a plaster composition comprising a starch having a Brookfield viscosity of less than 60 cps at a temperature below 60° C. and a Brookfield viscosity greater than 10,000 cps at a temperature of 70° C.

2. The method according to claim 1, wherein the compressive strength of the plasterboard is increased by at least 0.5 MPa.

3. The method according to claim 1, wherein the starch has a Brookfield viscosity of less than 20 cps at a temperature of 60° C.

4. The method according to claim 1, wherein the starch has a Brookfield viscosity of greater than 20,000 cps at a temperature of 70° C.

5. The method according to claim 1, wherein the starch has a Brookfield viscosity of greater than 30,000 cps at a temperature of 70° C.

6. The method according to claim 1, wherein the starch has a Brookfield viscosity of greater than 60,000 cps at a temperature of 80° C.

7. The method according to claim 1, wherein the starch is non-retrograding.

8. The method according to claim 1, wherein the starch has a viscosity at 25° C., after cooling following heating of the starch solution up to 90° C., which is greater than the maximum viscosity obtained during heating of said starch solution.

9. The method according to claim 1, wherein the starch has a viscosity at 25° C., after cooling following heating of the starch solution up to 90° C., of at least 100,000 cps.

10. The method according to claim 1, wherein the starch has a viscosity at 25° C., after cooling following heating of the starch solution up to 90° C., of at least 300,000 cps.

* * * * *